United States Patent [19]
Elmer et al.

[11] 3,747,304
[45] July 24, 1973

[54] MEANS FOR REDUCING FOAM ACCUMULATION IN A SEPARATION DRUM

[75] Inventors: Gary W. Elmer, Chicago Heights; Karl A. Muller, Jr., Homewood, both of Ill.

[73] Assignee: Standard Oil Company, Chicago, Ill.

[22] Filed: July 28, 1972

[21] Appl. No.: 276,107

Related U.S. Application Data

[63] Continuation-in-part of Ser. No. 134,122, April 15, 1971, abandoned.

[52] U.S. Cl. .................................. 55/178, 55/206
[51] Int. Cl. ............................................ B01d 19/02
[58] Field of Search .................. 55/38, 45, 52, 178, 55/206, 220, 240; 159/DIG. 5; 261/114 R

[56] References Cited
UNITED STATES PATENTS

| | | | |
|---|---|---|---|
| 24,543 | 6/1859 | Dickinson | 261/114 R |
| 755,705 | 3/1904 | Schanche | 261/114 R |
| 1,782,735 | 11/1930 | MacKenzie | 261/114 R |
| 2,926,754 | 5/1960 | Ragatz | 55/38 |
| 3,653,186 | 4/1972 | McLendon | 55/240 X |

Primary Examiner—Samih N. Zaharna
Assistant Examiner—Richard W. Burks
Attorney—Arthur G. Gilkes, James L. Wilson et al.

[57] ABSTRACT

The means comprises a horizontal distributor tray having an outlet weir and at least one horizontal foam retaining tray having an outlet weir and a foam retaining baffle, the distributor tray and one or more foam retaining trays being positioned with the inlet to the separator drum and to one another in such a manner that the liquid containing some gas coming into the drum is collected on the horizontal distributor tray and directed in a descending stream from the distributor tray to fall upon and be collected by the foam retaining tray located directly below so that liquid collected on the foam retaining tray will flow under the foam retaining baffle and over the outlet weir of the foam retaining tray in a descending stream. Additional foam retaining trays would see the descending liquid in sequence.

11 Claims, 4 Drawing Figures

PATENTED JUL 24 1973 3,747,304

3,747,304

MEANS FOR REDUCING FOAM ACCUMULATION IN A SEPARATION DRUM

CROSS REFERENCE TO RELATED APPLICATION

This is a continuation-in-part application of our co-pending application United States Ser. No. 134,122, which was filed on Apr. 15, 1971, and now abandoned.

BACKGROUND OF THE INVENTION

This invention relates to processes for the conversion of petroleum hydrocarbon streams. More particularly, it relates to the separator drums or columns that are employed in such processes for the conversion of petroleum hydrocarbon streams and to the foam accumulation that may occur in these separator drums or columns.

In general, an effluent that is obtained from the final reactor employed in a process for the conversion of a petroleum hydrocarbon stream is cooled to condense the normally liquid components and the resultant cooled effluent is sent to a separation zone. Such separation zone may comprise one or more separator drums or columns. If more than one separator column is employed, they may be connected in series and each column in the series may be operated at a pressure that is different than those in the other columns. The number of separator columns and the operating conditions employed in each will be dictated by the level of separation desired.

In the typical separation zone, the gas and vapors are separated from the liquid material. In some cases, the rate at which the mixed-phase stream is introduced into the separator drum or column is such that a foaming will occur in the separator drum. If the foam height is sufficiently large relative to the size of the separator drum, liquid, as foam, will be carried out of the separator drum via the separated gas stream. Such foam entrained in the vapor and/or gas stream, if in sufficient quantity, can cause operating problems downstream from the separator drum. Therefore, a means for reducing foam accumulation in a separator drum is desirable. The present invention comprises a means for reducing foam accumulation in a separator drum.

SUMMARY OF THE INVENTION

Broadly, according to the present invention, there is provided a means for reducing foam accumulation in a separator drum. This means comprises a horizontal distributor tray having an outlet weir and at least one horizontal foam retaining tray having an outlet weir and a foam retaining baffle, said distributor tray being located below the inlet to said drum in such a manner as to receive and collect liquied containing some vapor that is introduced into said drum and to direct the liquid smoothly in a descending stream from said distributor tray, said foam retaining tray being disposed in such a manner with respect to said distributor tray that all liquid descending from said distributor tray will fall upon and be collected by said foam retaining tray, said outlet weir of said foam retaining tray and said foam retaining baffle being disposed with one another in such a manner that liquid collected upon said foam retaining tray will flow under said foam retaining baffle and over said outlet weir of said foam retaining tray in a descending stream from said foam retaining tray.

Generally, more than one foam retaining tray will be employed. In addition, each foam retaining tray may have a plurality of holes on a portion of its horizontal surface to permit liquid to pass below the tray without passing over the outlet weir thereof. However, each hole is positioned on the tray so that any liquid passing from that tray through such hole will fall upon the tray directly below at a point on that lower tray where there is no hole.

BRIEF DESCRIPTION OF THE DRAWINGS

Four figures accompany this specification.

DESCRIPTION OF THE INVENTION AND PREFERRED EMBODIMENT

Figure 1:
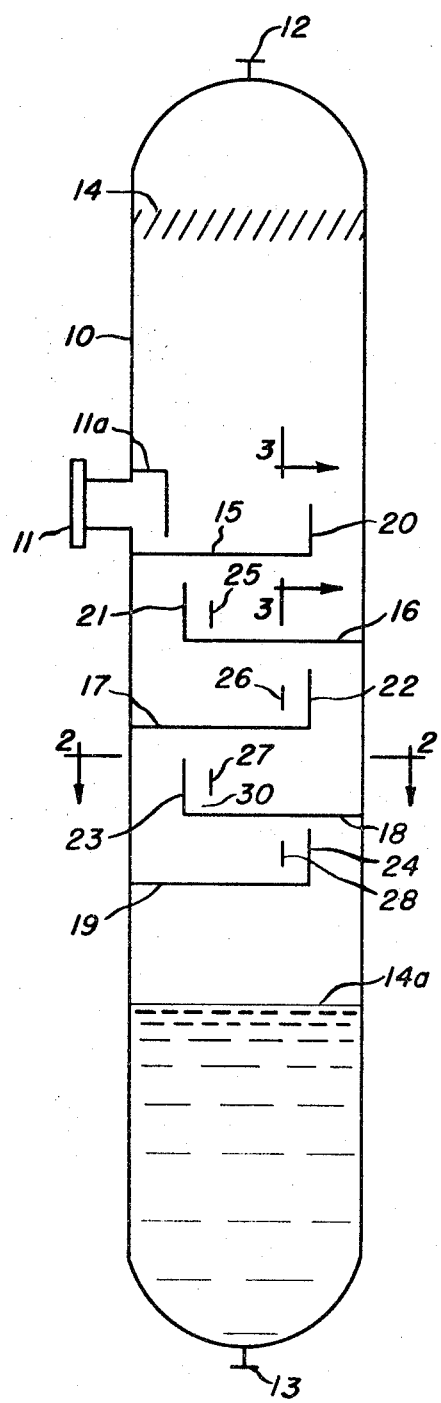
FIG. 1 depicts a vertical separator drum containing a preferred embodiment of the present invention.

The present invention comprises a means for reducing foam accumulation in a separator drum. If foam is permitted to accumulate in the drum, some of the foam may be entrained with the gas and vapors that are being separated from the liquid and such entrained foam will be carried out of the separator drum by the gas stream to cause downstream operating problems. Foam height appears to be a function of the liquid rate per unit of separator cross-sectional area. At low throughputs of liquid through the drum, the effect of increasing the liquid rate is small. At some higher level of liquid throughput, the foam height increases rapidly. As the foam height increases, the tendency for the foam to remain entrained in the gas and vapor stream increases as the latter passes out of the separator drum. This tendency is especially bad, if the foam layer rises above the inlet nozzle of the separator drum.

According to the present invention, there is provided a means for reducing foam accumulation in a separator drum. This means comprises a horizontal distributor tray having an outlet weir and at least one horizontal foam retaining tray having an outlet weir and a foam retaining baffle, said distributor tray being located below the inlet to said drum in such a manner as to receive and collect liquid containing some vapor that is introduced into said drum and to direct liquid smoothly in a descending stream from said distributor tray, said foam retaining tray being disposed in such a manner with respect to said distributor tray that all liquid descending from said distributor tray will fall upon and be collected by said foam retaining tray, said outlet weir of said foam retaining tray and said foam retaining baffle being disposed with one another in such a manner that liquid collected upon said foam retaining tray will flow under said foam retaining baffle and over said outlet weir of said foam retaining tray in a descending stream from said foam retaining tray.

As the liquid flows across a foam retaining tray, the foam at the upper surface of the liquid is held back by the foam retaining baffle while the liquid flows beneath the baffle to pass on over the outlet weir of the tray. This retention of foam greatly increases the surface contact area (in the drum) at the vapor-foam interface which permits the foam to break down, i.e., gas and/or vapor to disengage from the liquid.

In general, more than one foam retaining tray will be employed. Preferably, a plurality of foam retaining trays will be needed. The number of foam retaining trays will be dictated by the circumstances.

The liquid that is collected upon a foam retaining tray must descend from that tray. Unless some other means is provided, the liquid must pass over the outlet weir of that tray in a descending stream from that particular tray. To facilitate the removal of the lqiuid from the tray, while maintaining a predetermined height of liquid, there may be provided on the tray a number of holes through which the liquid on that particular tray may pass. These holes are arranged on the tray and are present in such a manner as to permit liquid to pass therethrough without permitting any of the foam on the upper surface of the liquid to be carried therethrough. When a plurality of foam retaining trays is employed in a separator drum, each of the holes that are provided on such foam retaining trays is positioned on a particular foam retaining tray in relation to the holes on the next foam retaining tray located directly below so that the liquid descending from such hole on said particular tray will not fall upon the tray located directly below at any point where any of the holes on that lower tray is positioned. In a similar manner, the holes on the foam retaining tray which is located directly above said particular tray are positioned in such a way that any liquid passing through any of them will not fall upon said particular tray where said hole on said particular tray is located. Consequently, liquid descending either from any hole or from the outlet weir of any foam retaining tray to the foam retaining tray located directly below will not fall upon any point on the latter tray where any hole is located.

In view of this, where there is a plurality of drain holes on a plurality of foam retaining trays in a separator drum, the drain holes are present on each of said foam retaining trays in such a manner that each of the drain holes on a particular foam retaining tray is not directly below a drain hole on the tray above or directly above a drain hole on the tray below. These drain holes are employed to reduce the amount of liquid flowing over the outlet weirs of the foam retaining trays.

While the present invention is employed primarily to reduce foam accumulation in a vertical separator drum or column, it may be used advantageously in a horizontal separator drum, if the need arises.

Referring to FIG. 1, which depicts a vertical separator drum containing a preferred embodiment of the present invention, the vertical separator drum 10 has an inlet 11 through which the effluent to be separated into gas and liquid is passed into separator drum 10. The separated gas and vapors are removed from separator drum 10 by way of outlet 12, while the liquid is collected in the bottom of the drum and withdrawn from the drum 10 via outlet 13. A demister pad 14 is located near the top of separator drum 10. This demister pad is installed in the separator drum to facilitate the separation of any entrained liquid from the gases and vapors as the latter pass up through the drum. Liquid collects in the bottom of the drum to a level 14a.

The preferred embodiment of the present invention which is installed in separator drum 10 comprises horizontal distributor tray 15 and horizontal foam retaining trays 16, 17, 18, and 19. Distributor tray 15 has an outlet weir 20. Foam retaining trays 16, 17, 18, and 19 have outlet weirs 21, 22, 23, and 24, respectively, and foam retaining baffles 25, 26, 27, and 28, respectively.

The liquid-gas mixture to be separated is introduced into separator drum 10 by way of inlet 11. Inlet flow deflector 11a guides the fluid onto distributor tray 15. Distributor tray 15 is positioned below inlet 11 so as to receive and collect the liquid containing some vapor that is introduced into drum 10. The liquid is collected on the distributor tray 15 and passes across the tray and over the associated outlet weir 20 to descend in a stream to foam retaining tray 16 located below distributor tray 15 and positioned in such a manner that the liquid stream descending contacts the foam retaining tray 16 at a point whereby the liquid will have a maximum distance to flow across the tray 16 to pass over the associated outlet weir 21. Liquid being collected on foam retaining tray 16 passes under foam retaining baffle 25 prior to its passing over outlet weir 21. The liquid stream descending from outlet weir 21 is collected on foam retaining tray 17 to pass under associated foam retaining baffle 26 and over outlet weir 22 to descend to foam retaining tray 18. Foam retaining tray 17 is positioned with respect to foam retaining tray 16 so that the liquid descending from outlet weir 21 will contact tray 17 and have a maximum distance to travel across tray 17 prior to passing over outlet weir 22. The lqiuid stream descending from outlet weir 22 is collected on foam retaining tray 18. The collected liquid passes under foam retaining baffle 27 and over outlet weir 23. Foam retaining tray 18 is positioned with foam retaining tray 17 so that the liquid descending from outlet weir 22 contacts foam retaining tray 18 at a point where there will be maximum distance from this point of contact on tray 18 to outlet weir 23. The liquid stream descending from outlet weir 23 contacts foam retaining tray 19. The liquid being collected on foam retaining tray 19 passes under foam retaining baffle 28 and over associated outlet weir 24. Foam retaining tray 19 is positioned with respect to foam retaining tray 18 so as to have the liquid from outler weir 23 contact foam retaining tray 19 at a point on tray 19 which provides a maximum distance from that point to outlet weir 24.

As the liquid containing a certain amount of foam at its surface passes across each of the foam retaining trays, the foam is held on the particular tray by the associated foam retaining baffle and is broken down while the liquid is permitted to flow under the baffle. In this manner, the liquid is separated from the foam and, if any additional foam is released, this latter foam is separated from the liquid and dispersed by means of the subsequent foam retaining trays.

Figure 2:
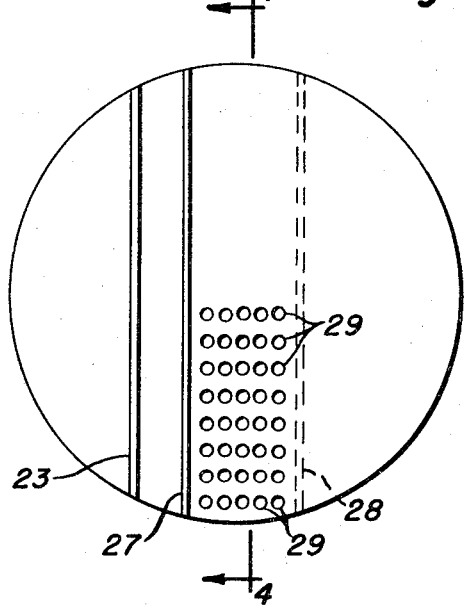
FIG. 2 shows a cross-sectional view of a separator drum looking down upon a typical foam retaining tray.

FIG. 2 represents a cross-sectional view of foam retaining tray 18, which is typical of all foam retaining trays. The dotted lines represent foam retaining baffle 28 that is associated with foam retaining tray 19 located directly below foam retaining tray 18.

If drain holes are required on the foam retaining tray because of liquid throughput, such drain holes, represented as drain holes 29, may be located on foam retaining tray 18 between foam retaining baffle 27 and the line 28, which represents the foam retaining baffle on the tray below. Please note that these drain holes 29 are positioned in only one-half of the area between foam retaining baffle 27 and the line 28. On the foam retaining tray 19, drain holes would be located on that portion of tray 19 which was directly below that part of the area on foam retaining tray 18 between foam retaining baffle 27 and dotted line 28 that did not have drain holes 29. If this sequence were employed for alternate foam retaining trays, liquid falling from a particular foam retaining tray through drain holes on that tray onto the next lower foam retaining tray would not contact surface area on the lower foam retaining tray that contains drain holes.

Figure 3:
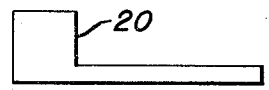
FIG. 3 represents an elevation of an outlet weir that is employed on either the distributor tray or a foam retaining tray.

FIG. 3 represents an elvation of outlet weir 20 on distributor tray 15. The outlet weirs on the foam retaining trays have shapes that are similar to outlet weir 20 in FIG. 3. However, the dimensions could be slightly different. A portion of the outlet weir is raised, which raised portion prevents liquid downflow at that point, thus allowing free upflow of vapor.

Figure 4:
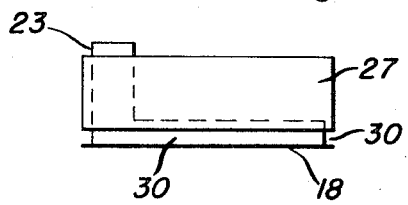
FIG. 4 represents an elevation of a foam retaining baffle when looking toward the baffle from the side of the tray opposite that where the outlet weir is located.

FIG. 4 provides an elevation of foam retaining baffle 27, when looking toward the baffle from the side of the tray that is opposite that where the outlet weir 23 is located. Space 30 is located between baffle 27 and tray 18. The height of this space should be equal to or preferably less than the minimum height of the outlet weir 23.

EXAMPLE

A high pressure separator in a commercial gas oil desulfurizer unit was found to have appreciable liquid entrained in the gas that was being withdrawn from the separator drum. This particular vertical separator drum had a size that met the usual design criteria, yet when the liquid feed rate to the unit was increased above 12,000 barrels per day (b/d), liquid was carried out of the separator drum in the gas stream.

This particular separator drum was similar to that shown in FIG. 1. Therefore, FIG. 1 will be referred to for the description of this drum. The desulfurizer unit was to be operated to provide a product containing less than 0.3 weight percent sulfur. The drum was approximately 20 feet high and about 4 feet in diameter. The inlet was 13 feet 9 inches above the lower end of the cyclindrical section of the drum. The separator drum was operated at a pressure of about 550 psi and a temperature of approximately 100°F.

The material being introduced into the drum by way of the inlet was a mixed-phase desulfurizer reactor effluent and comprised gas oil, hydrogen, light gaseous hydrocarbons, and hydrogen sulfide. Liquid descended to the drum bottom where a level was held at about 6 feet with a control valve in the bottom line. With 12,000 b/d of desulfurizer feed, liquid was passing through the drum at a rate of about 29 gallons per minute per square foot of drum cross-sectional area. After a hold up of one minute in the drum, the liquid proceeded to additional processing. Gas separated from the liquid was passed through a demister pad and then to hydrogen sulfide removal facilities prior to being recycled to the desulfurizer reactor. The liquid that was entrained in the gas stream was caused by an excessive accumulation of foam in the drum.

To reduce the foam accumulation in the vertical separator drum, a horizontal distributor tray and four horizontal foam retaining trays were installed as shown in FIG. 1 hereinabove. The distributor tray had an associated outlet weir which had a minimum height of 1 inch and a maximum height of 10 inches. The 10-inch height extended 11½ inches across the tray, while the minimum height had a length of approximately 2.5 feet.

Each of the foam retaining trays had an associated foam retaining baffle, the lower edge of which was located 1 inch above the surface of the tray. Each foam retaining baffle had a rectangular cross section. The height of the baffle was 8 inches and the length was 3 feet 10½ inches. In addition, each foam retaining tray had an associated outlet weir having a minimum height of 1.5 inches and a maximum height of 10 inches. Again the portion with the maximum height had a length of 11½ inches, while the portion of the weir having the minimum height was approximately 2.5 feet long.

In this embodiment, each of the foam retaining trays contained 45 one-inch drain holes. As described hereinabove, each subsequent lower tray had drain holes on the tray on the side opposite from that of the tray above. In other words, there was on each foam retaining tray a plurality of drain holes and these drain holes were present in such a manner that the drain holes on a particular tray were not directly below drain holes in the tray above or directly above drain holes on the tray below. The drain holes were employed to reduce the amount of liquid flowing over the outlet weir associated with that particular foam retaining tray, thus preventing excess liquid height in the tray.

In this embodiment, the foam retaining baffle for a particular foam retaining tray was located above the tray and 6 inches in front of and parallel to the associated outlet weir for that foam retaining tray on the tray side of that weir. The maximum distance from the front edge of the foam retaining tray to the inside surface of the separator drum was 12 inches.

When the total gas flow was about 1.3 million standard cubic feet per hour (MSCFH) and liquid feed throughput to the desulfurizer was 12,000 b/d or less, no appreciable liquid carry over by the gas stream from the separator drum was noted. When the feed throughput to the desulfurizer unit was increased to values above 12,000 b/d, and the total gas flow was about 1.3 MSCFH, entrained liquid was found in the gas stream leaving the separator drum. After the preferred embodiment of the present invention, as described hereinabove, was installed in the separator drum, a rate of liquid feed throughput as high as 16,800 b/d at a gas flow of 1.3 MSCFH could be employed without appreciable liquid carry over in gas leaving the separator drum. Further increases in liquid throughput may have been possible; however, these were limited by equipment capacity.

This demonstrates the effectiveness of the present invention for reducing foam accumulation in a separator drum, resulting in no appreciable liquid carry over in the gas stream leaving the separator drum.

What is claimed is:

1. Means for reducing foam accumulation in a separator drum, which means comprises a horizontal distributor tray having an outlet weir and at least one horizontal foam retaining tray having an outlet weir and a foam retaining baffle, said distributor tray being located below the inlet to said drum in such a manner as to receive and collect liquid containing some vapor that is introduced into said drum and to direct liquid smoothly in a descending stream from said distributor tray, said foam retaining tray being disposed in such a manner with respect to said distributor tray that all liquid descending from said distributor tray will fall upon and be collected by said foam retaining tray, said outlet weir of said foam retaining tray and said foam retaining baffle being disposed with one another in such a manner that liquid collected upon said foam retaining tray will flow under said foam retaining baffle and over said outlet weir of said foam retaining tray in a descending stream from said foam retaining tray, said outlet weir having a raised portion at one end so that no liquid will flow over that end of said outlet weir, thereby providing a passage for ascending vapor.

2. The means of claim 1 wherein there is a plurality of horizontal foam retaining trays, each of said trays having an outlet weir and a foam retaining baffle.

3. The means of claim 1 wherein said foam retaining baffle is parallel to said outlet weir of said foam retaining tray.

4. The means of claim 2 wherein a plurality of drain holes are present on each of said foam retaining trays in such a manner that the drain holes on a particular tray are not directly below drain holes on the tray above or directly above drain holes on the tray below, said drain holes being employed to reduce the amount of liquid flowing over the outlet weir of said particular tray.

5. The means of claim 2 wherein said plurality of horizontal foam retaining trays comprises four horizontal foam retaining trays.

6. The means of claim 2 wherein the foam retaining baffle and the outlet weir associated with each of said foam retaining trays are parallel to each other.

7. The means of claim 2 wherein a plurality of drain holes are present on each of said foam retaining trays in such a manner that the drain holes on a particular foam retaining tray are located on said particular foam retaining tray on the side of said particular foam retaining tray that is opposite to the side containing drain holes of any tray directly above and any tray directly below said particular foam retaining tray and are not directly below drain holes on the foam retaining tray above or directly above the drain holes on the foam retaining tray below, said drain holes being employed to reduce the amount of liquid flowing over the outlet weir of said particular tray.

8. The means of claim 2 wherein a plurality of drain holes are present on each of said foam retaining trays in such a manner that each of the drain holes on a particular foam retaining tray is not directly below a drain hole on the tray above or directly above a drain hole on the tray below, said drain holes being employed to reduce the amount of liquid flowing over the outlet weir of said particular foam retaining tray.

9. The means of claim 5 wherein a plurality of drain holes are present on each of said foam retaining trays in such a manner that the drain holes on a particular tray are not directly below drain holes on the tray above or directly above drain holes on the tray below, said drain holes being employed to reduce the amount of liquid flowing over the outlet weir of said particular tray.

10. The means of claim 5 wherein a plurality of drain holes are present on each of said foam retaining trays in such a manner that the drain holes on a particular foam retaining tray are located on said particular foam retaining tray on the side of said particular foam retaining tray that is opposite to the side containing drain holes of any foam retaining tray directly above and any foam retaining tray driectly below said particular foam retaining tray and are not directly below drain holes on the foam retaining tray above or directly above the drain holes on the foam retaining tray below, said drain holes being employed to reduce the amount of liquid flowing over the outlet weir of said particular foam retaining tray.

11. The means of claim 5 wherein a plurality of drain holes are present on each of said foam retaining trays in such a manner that each of the drain holes on a particular foam retaining tray is not directly below a drain hole on the tray above or directly above a drain hole on the tray below, said drain holes being employed to reduce the amount of liquid flowing over the outlet weir of said particular foam retaining tray.

* * * * *

PO-1050
(5/69)

UNITED STATES PATENT OFFICE
CERTIFICATE OF CORRECTION

Patent No. 3,747,304            Dated July 24, 1973

Inventor(s) Gary W. Elmer and Karl A. Muller, Jr.

It is certified that error appears in the above-identified patent and that said Letters Patent are hereby corrected as shown below:

In the title on the introduction page and at top of Column 1, "Separation" should be -- Separator --.

Column 8, line 25, "driectly" should be -- directly --.

Signed and sealed this 9th day of July 1974.

(SEAL)
Attest:

McCOY M. GIBSON, JR.
Attesting Officer

C. MARSHALL DANN
Commissioner of Patents